United States Patent
Hansen et al.

(10) Patent No.: US 6,840,371 B2
(45) Date of Patent: Jan. 11, 2005

(54) LINK HAVING A TWISTED SIDE GUARD

(75) Inventors: Kevin S. Hansen, Grafton, WI (US); Paul M. Koeferl, Brown Deer, WI (US)

(73) Assignee: Rexnord Industries, Inc., Milwaukee, WI (US)

(*) Notice: Subject to any disclaimer, the term of this patent is extended or adjusted under 35 U.S.C. 154(b) by 0 days.

(21) Appl. No.: 10/174,213

(22) Filed: Jun. 17, 2002

(65) Prior Publication Data

US 2003/0000810 A1 Jan. 2, 2003

Related U.S. Application Data

(60) Provisional application No. 60/302,206, filed on Jun. 29, 2001.

(51) Int. Cl.[7] .............................. B65G 17/06
(52) U.S. Cl. .................. 198/850; 198/853; 198/851; 198/778
(58) Field of Search .................. 198/850, 853, 198/851, 778, 822

(56) References Cited

U.S. PATENT DOCUMENTS

| | | | | | |
|---|---|---|---|---|---|
| 3,249,508 | A | * | 5/1966 | Rachais | 176/59 |
| 4,155,444 | A | * | 5/1979 | Kovats | 198/822 |
| 4,473,151 | A | * | 9/1984 | Kumferman | 198/822 |
| 4,603,776 | A | * | 8/1986 | Olsson | 198/778 |
| 4,821,872 | A | * | 4/1989 | Lapeyre | 198/853 |
| 4,953,693 | A | * | 9/1990 | Draebel | 198/853 |
| 6,029,797 | A | * | 2/2000 | Olsson | 198/778 |
| 6,073,756 | A | * | 6/2000 | Damkjaer et al. | 198/853 |
| 6,216,854 | B1 | * | 4/2001 | Damkjaer et al. | 198/853 |

* cited by examiner

Primary Examiner—Christopher P. Ellis
(74) Attorney, Agent, or Firm—Quarles & Brady LLP

(57) ABSTRACT

A modular belt link which includes a link base having at least one hinge barrel for connecting the link to adjacent links. A side guard is fixed to the link base, and defines a non-planar wall having a bottom and top joined by sides. The wall is twisted relative to an axis of rotation extending through said top and bottom.

15 Claims, 4 Drawing Sheets

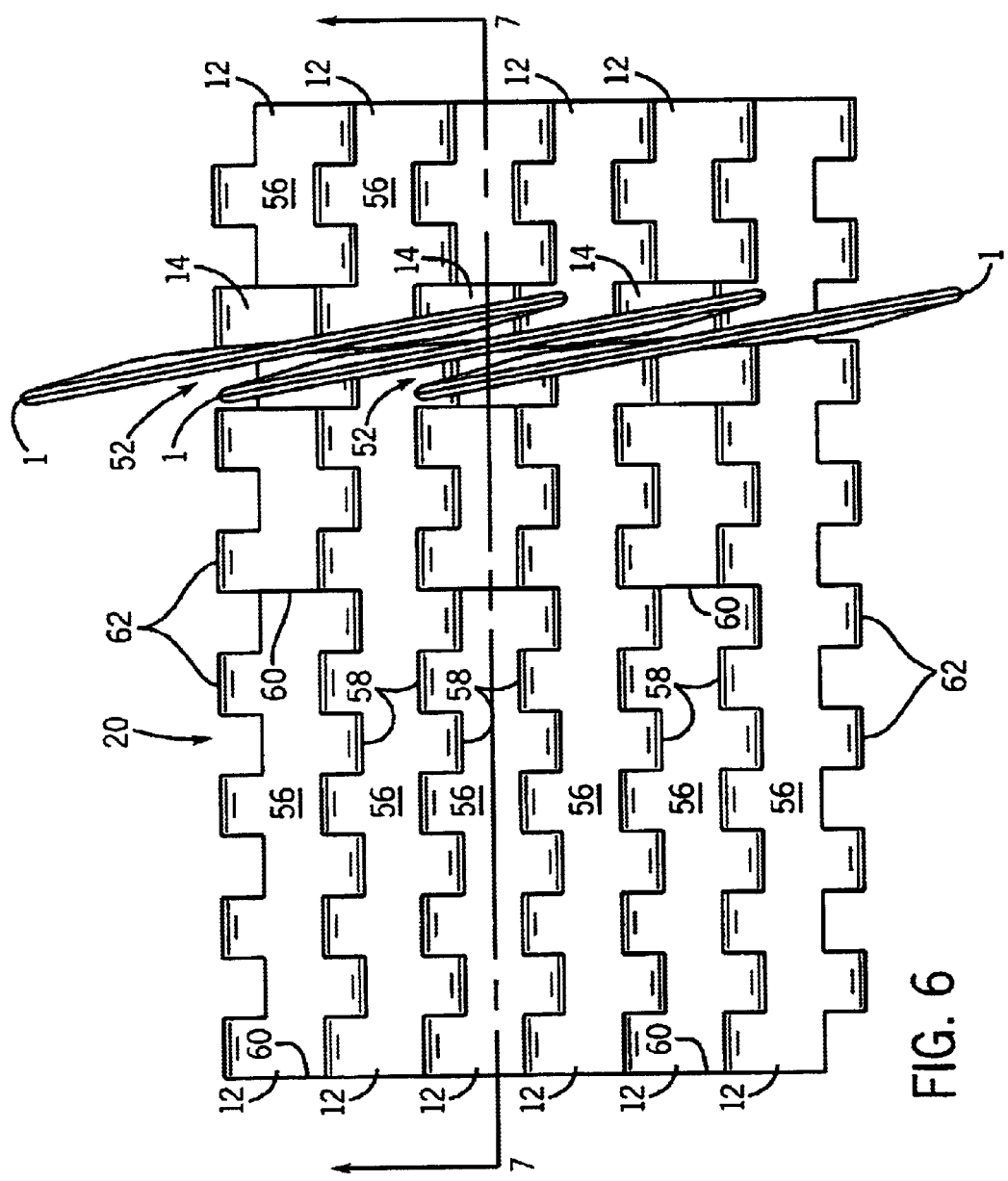

US 6,840,371 B2

LINK HAVING A TWISTED SIDE GUARD

CROSS REFERENCES TO RELATED APPLICATIONS

This application claims the priority benefit of U.S. Provisional Patent Application No. 60/302,206 filed on Jun. 29, 2001.

STATEMENT REGARDING FEDERALLY SPONSORED RESEARCH

Not Applicable.

BACKGROUND OF THE INVENTION

The present invention relates to modular conveyor chains, and more particularly to a side guard for use on a modular conveyor chain link.

Modular belting is formed from interconnected links which are supported by a frame and driven to transport a product. Each link has a support surface which supports the product as the belting is being driven along the frame. In certain applications, side guards are fixed to, or are formed as an integral part of, the link to prevent a conveyed load from falling off of the belt. Side guards attached to the belt move with the product being conveyed to minimize relative motion between the support surface and the side guard. Minimizing the relative motion reduces product damage.

Prior art side guards, such as shown in FIGS. 1–4, are fixed to a modular belt, and are arranged in overlapping relation to prevent large longitudinal gaps from forming when the belt flexes around a drive or idle sprocket. The side guards are typically attached to the belt near the belt width edges, and are fixed at an angle, known as a shingle angle, relative to the belt edge to avoid interference between adjacent side guards.

The height of the side guard and amount of belt flexing required determines the extent of side guard overlap. As height or flexing requirements increase, more overlap is required to prevent gaps from opening up as the belt flexes. Increasing the overlap, typically requires a greater shingle angle to prevent interference between the side guards as the belt flexes.

Increasing the shingle angle to prevent interference between the side guards increases the clearance between adjacent side guards. When conveying small products, increasing overlap, and thus the shingle angle, between side guards is undesirable because the product can wedge between the side guards causing damage to the side guards and the product. Moreover, increasing the shingle angle causes the side guards to consume more of the belt area, thus reducing the usable area of the belt. Accordingly, a need exists for a belt having a side guard which can negotiate small sprockets without requiring a large shingle clearance.

SUMMARY OF THE INVENTION

The present invention provides a modular belt link which includes a link base having at least one hinge barrel for connecting the link to adjacent links. A side guard is fixed to the link base, and defines a non-planar wall having a bottom and top joined by sides. The wall is twisted relative to an axis of rotation extending through said top and bottom.

A general objective of the present invention is to provide a side guard link which minimizes interferences while maximizing product support surface area. This objective is accomplished by twisting the side guard to increase clearances at the side guard top while minimizing the encroachment of the side guard bottom on the support surface are of the belt.

This and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 6 is a top view of the belt of FIG. 5; and

FIG. 7 is a sectional view along line 7—7 of FIG. 6.

DETAILED DESCRIPTION OF THE INVENTION

Figure 1:
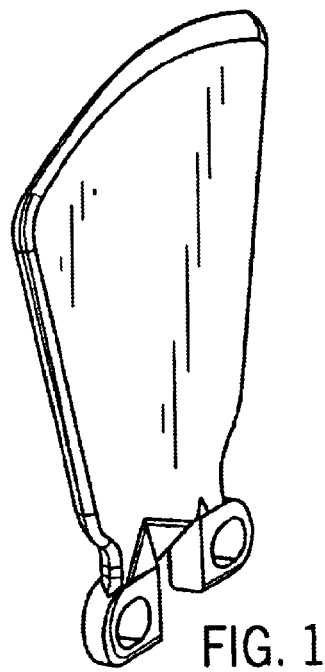
FIG. 1 is a perspective view of prior art modular belt link having a side guard.
Figure 2:
FIG. 2 is a top view of the link of FIG. 1.
Figure 3:
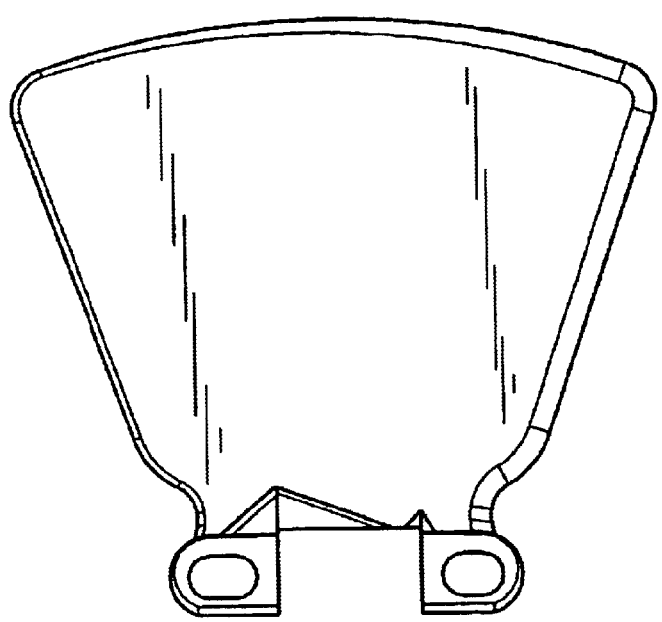
FIG. 3 is an elevational view of the link of FIG. 1.
Figure 4:
FIG. 4 is an edge view of the link of FIG. 1.
Figure 5:
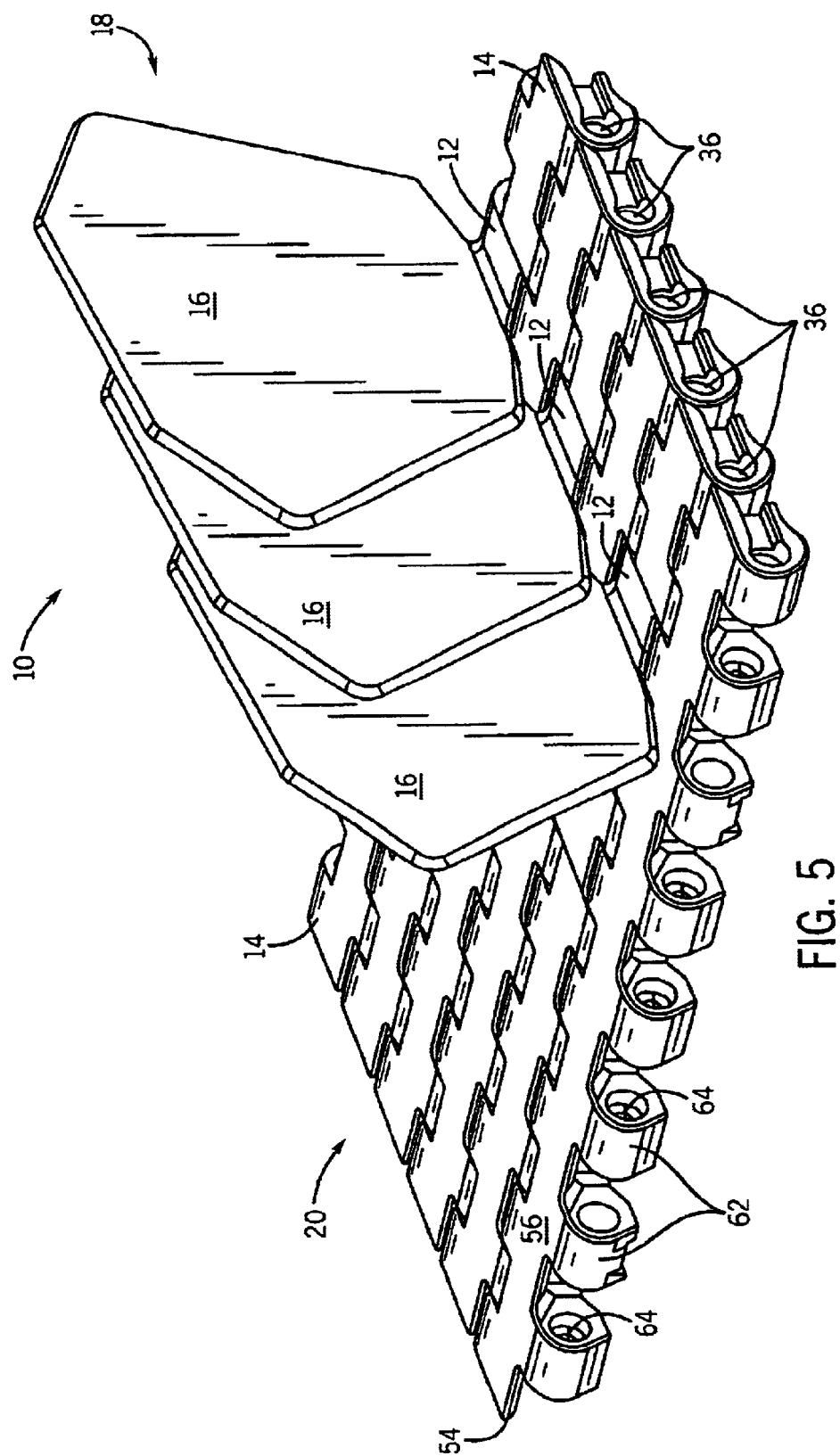
FIG. 5 is a perspective view of a modular belt incorporating the present invention.

A modular conveyor belt 10, shown in FIGS. 5–7, includes a plurality of chain links 12 and side guard links 14. The links 12, 14 are pivotally linked to adjacent links 12, 14 to form the continuous belt 10. The side guard links 14 include side guards 16, and are arranged to define a continuous sidewall 18 which defines an edge of a belt support area 20.

Referring to FIGS. 8–11, each side guard link 14 includes a link base 22 including a body 24 having a top surface 26 joined by lateral edges 28 and ends 30. Hinge barrels 32 are formed as an integral part of the link body 24 extend alternatively past the opposing lateral edges 28. Each hinge barrel 32 extending past the same lateral edge 28 includes an opening 34 which is aligned with a hinge barrel of an adjacent link to receive a hinge pin 36 (shown in FIG. 5) which pivotally links the adjacent links 12, 14 together. Although a link base having a body is preferred, the base can be the hinge barrels without the body, such as shown in FIGS. 1–4, without departing from the scope of the present invention.

The side guard 16 is, preferably, formed as an integral part of the link base 22, and has a top 42 and bottom 44 joined by sides 46 which define a non-planar wall 48. The non-planar wall 48 extends substantially perpendicular to the link body top surface 24 and defines a portion of one of the continuous sidewalls 18. Although forming the side guard 16 as an integral part of the link base 22 is shown, the side guard 16 can be fixed to the link base 22 using methods known in the art, such as by welding, mechanical fasteners, interference fits, and the like without departing from the scope of the present invention. Moreover, as disclosed above, the side guard 16 can be fixed directly to the hinge barrels 32 without an intervening link body 24, such as shown in FIGS. 1–4, without departing from the scope of the present invention.

Figure 9:
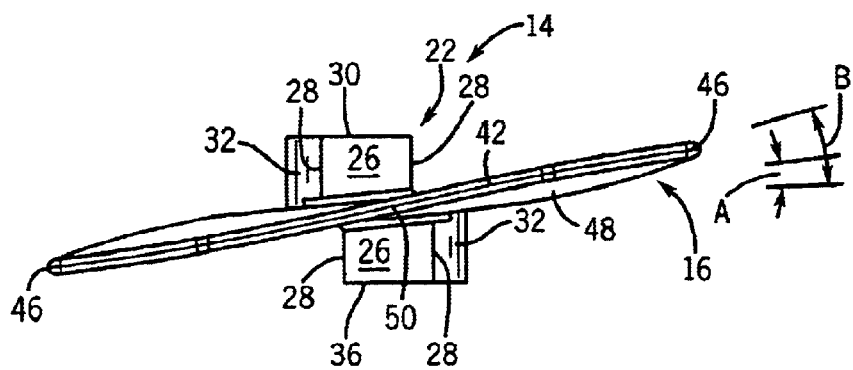
FIG. 9 is a top view of the link of FIG. 8.
Figure 8:
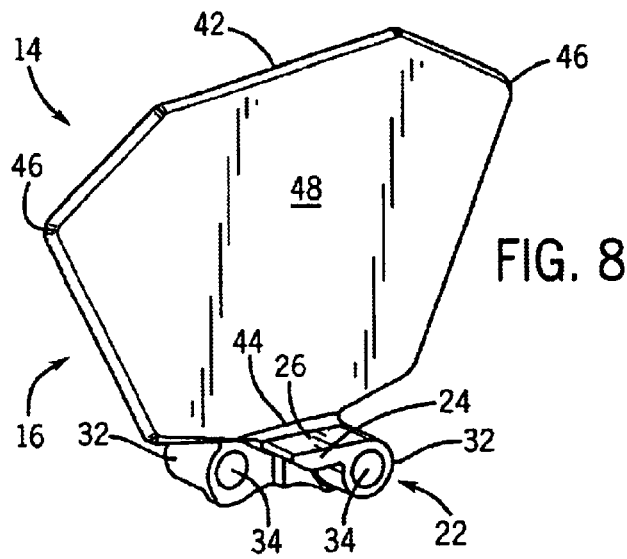
FIG. 8 is a perspective view of the side guard link of FIG. 4.
Figure 10:
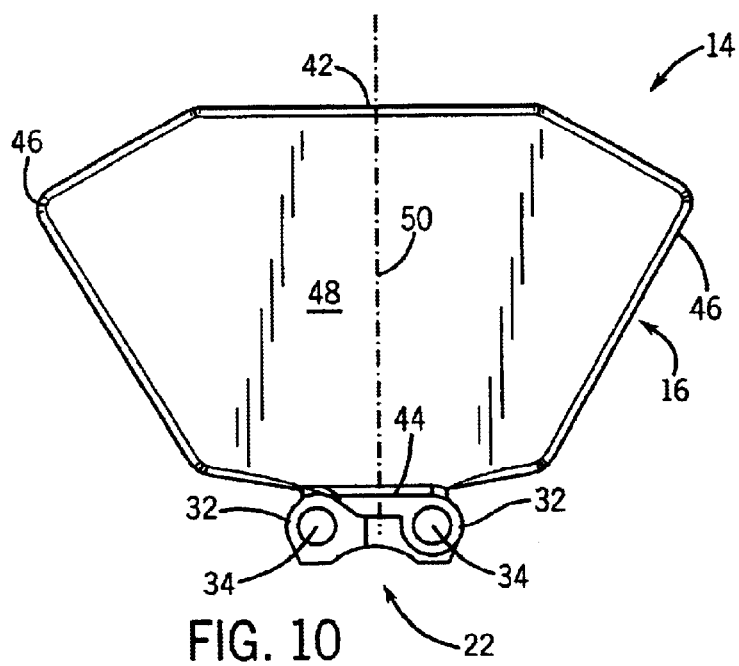
FIG. 10 is an elevational view of the link of FIG. 8.
Figure 11:
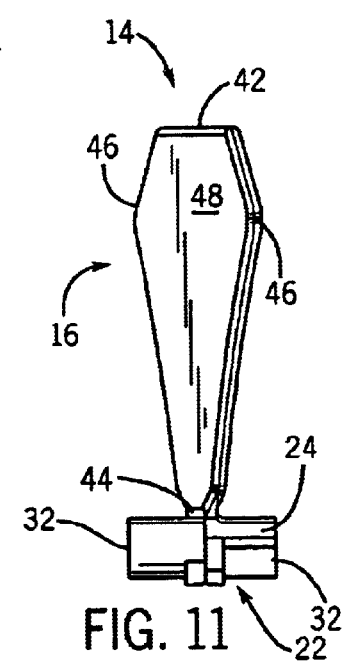
FIG. 11 is an edge view of the link of FIG. 8.

The non-planar wall 48 is twisted relative to an axis of rotation 50 extending through the side guard top 42 and bottom 44. Preferably, the axis of rotation 50 is perpendicular to the link top surface 24. As shown in FIG. 9, the amount of twist is defined by the difference between the angle A that the side guard bottom 44 is rotated about the axis 50 relative to a link direction of travel 41 and the angle B that the side guard top 42 is rotated about the axis 50 relative to the link direction of travel 41. Advantageously, the twisted side guard 16 accommodates the increased interference requirement at the side guard top 42 without decreasing the useable belt support area 20 proximal the side guard bottom 44.

The amount of twist can also be quantified by an angle C defined by a first vertical plane 43 defined by the side guard bottom 44 and passing through the axis of rotation 50 and a second vertical plane 45 defined by the side guard top 42 and passing through the axis of rotation 50. The two planes 43, 45 are not coplanar and intersect at the axis of rotation 50 to define the angle C which is not 0°. Most preferably, the side guard top 42 is rotated more than the side guard bottom 44.

The amount of twist is dependent upon the height of the side guard 16, the greatest amount of belt back flex required, and the desired clearances between adjacent side guards 16. Providing a twisted side guard 16 is especially advantageous for conveyor belts with small pitches, such as less than one inch. Small pitch belts are generally used to convey small products which can pass between gaps 52 (shown in FIG. 6) between the side guards 16, and the belt is typically required to back flex to a tighter radii than longer pitch belts.

The thickness of the side guard 16 can also be varied to minimize the gaps 52 while maintaining required clearances between the adjacent side guards 16. Preferably, as shown in FIG. 7, the side guard wall thickness decreases from the side guard bottom 44 to the side guard top 42 to efficiently close the gaps 52 between the adjacent side guards 16 proximal the side guard bottom 44 while providing the necessary clearance proximal the side guard top 42.

Referring back to FIGS. 5 and 6, the side guard links 14 intermesh with typical chain links 12 to form the belt 10. As shown in FIGS. 5 and 6, a typical chain link 12, can include a link body 54 having a top surface 56 joined by lateral edges 58 and ends 60. Hinge barrels 62 are formed as an integral part of the link body 54 extend alternatively past the opposing lateral edges 58, and interdigitively mate with hinge barrels 62 formed in an adjacent link body 54. Each hinge barrel 62 extending past the same lateral edge 58 includes a coaxial opening 64 which receive a hinge pin 36 to pivotally link adjacent links 12, 14 together.

The side guard links are, preferably, molded plastic, and formed as a single piece. However, the link base and side guard can be formed separately from the same or different materials, and comprise multiple pieces without departing from the scope of the invention. For example, the side guard can be formed from a metal, such as stainless steel, which is joined to a base formed from plastic, and vice versa, without departing from the scope of the claims.

While there has been shown and described what are at present considered the preferred embodiments of the invention, it will be obvious to those skilled in the art that various changes and modifications can be made therein without departing from the scope of the invention defined by the appended claims.

We claim:

1. A modular belt link comprising:
   a link base having at least one hinge barrel for connecting the link to adjacent links, said link base having a direction of travel;
   a side guard fixed to said link base, and defining a non-planar wall having a bottom and top joined by sides, said wall being twisted relative an axis of rotation extending through said top and bottom.

2. The modular belt link as in claim 1, in which said bottom defines a first angle of rotation relative to said base direction of travel and said top defines a second angle of rotation relative to said base direction of travel, wherein said first and second angles of rotation are unequal.

3. The modular belt link as in claim 2, in which said second angle of rotation is greater than said first angle of rotation.

4. The modular belt link as in claim 1, in which said base includes a body, and said hinge barrel and said side guard are fixed to said body.

5. The modular belt link as in claim 4, in which said body includes a planar top surface, and said axis of rotation is substantially perpendicular to said top surface.

6. The modular belt link as in claim 1, in which said bottom is thicker than said top.

7. The modular belt link as in claim 1, in which said base is formed as an integral part of said side guard.

8. A side guard for use on a conveyor belt, said side guard comprising:
   a non-planar wall defined by a top edge and bottom edge joined by side edges, and including an axis of rotation extending between said top edge and said bottom edge, wherein said non-planar wall is twisted relative to said axis of rotation, wherein a first vertical plane defined by said bottom edge passes through said axis of rotation, and a second vertical plane defined by said top edge passes through said axis of rotation, wherein said first and second planes are not coplanar.

9. The side guard as in claim 8, including a link based fixed to said bottom edge.

10. The side guard as in claim 9, in which said base is formed as an integral part of the side guard.

11. The side guard as in claim 8, in which said bottom edge is thicker than said top edge.

12. A belt link comprising:
   a link base having at least one hinge barrel for connecting the link to adjacent links, said link base having a direction of travel;
   a side guard fixed to said link base, and including a non-planar wall defined by a top edge and bottom edge joined by side edges, said non-planar wall including an axis of rotation extending between said top edge and said bottom edge, wherein said non-planar wall is twisted relative to said axis of rotation.

13. The belt link as in claim 12, in which a first vertical plane defined by said bottom edge passes through said axis of rotation, and a second vertical plane defined by said top edge passes through said axis of rotation, wherein said first and second planes are not coplanar.

14. The belt link as in claim 12, in which said base is formed as an integral part of the side guard.

15. The belt link as in claim 12, in which said bottom edge is thicker than said top edge.

* * * * *